US010821380B2

(12) United States Patent
Schofield

(10) Patent No.: US 10,821,380 B2
(45) Date of Patent: Nov. 3, 2020

(54) CORRUGATED FLUID INTAKE SCREEN

(71) Applicant: Aqseptence Group, Inc., New Brighton, MN (US)

(72) Inventor: Philip Schofield, Cobham (GB)

(*) Notice: Subject to any disclaimer, the term of this patent is extended or adjusted under 35 U.S.C. 154(b) by 82 days.

(21) Appl. No.: 15/570,086

(22) PCT Filed: Apr. 27, 2016

(86) PCT No.: PCT/US2016/029566
§ 371 (c)(1),
(2) Date: Oct. 27, 2017

(87) PCT Pub. No.: WO2016/176326
PCT Pub. Date: Nov. 3, 2016

(65) Prior Publication Data
US 2018/0126304 A1    May 10, 2018

Related U.S. Application Data

(60) Provisional application No. 62/153,304, filed on Apr. 27, 2015.

(51) Int. Cl.
| | | |
|---|---|---|
| *B01D 29/11* | (2006.01) | |
| *B23K 31/02* | (2006.01) | |
| *B01D 29/33* | (2006.01) | |
| *E21B 43/08* | (2006.01) | |
| *B01D 29/21* | (2006.01) | |
| *B23K 101/22* | (2006.01) | |
| *B23K 103/04* | (2006.01) | |

(52) U.S. Cl.
CPC ............ *B01D 29/111* (2013.01); *B01D 29/21* (2013.01); *B01D 29/333* (2013.01); *B23K 31/02* (2013.01);

(Continued)

(58) Field of Classification Search
CPC .... B01D 29/111; B01D 29/21; B01D 29/333; B01D 2201/122; B01D 2201/186;
(Continued)

(56) References Cited

U.S. PATENT DOCUMENTS 3,246,920 A    4/1966    Pall
3,486,626 A    12/1969   Close
(Continued)

OTHER PUBLICATIONS

Extended European Search Report for EP appplication No. 16787065.8 dated May 18, 2016, 7 pages.
(Continued)

*Primary Examiner* — Krishnan S Menon
*Assistant Examiner* — Waqaas Ali
(74) *Attorney, Agent, or Firm* — Patterson Tuente Pedersen, P.A.

(57) ABSTRACT

Corrugated screen filters and related method of fabrication whereby an available filter surface is increased so as to allow an increase a flow capacity of the corrugated screen filter. The corrugated screen filter can comprise a plurality of rods forming a series of alternate and angular ridges and grooves on a surface of the filter screen. The filter screen can be configured to have longitudinal corrugations only on an exterior surface of the filter screen or alternatively, the filter screen can be configured to have longitudinal corrugations only on an interior surface of the filter screen. The alternate angular ridges and grooves can form corrugations in a variety of configurations including, but not limited to, a sinusoidal wave structure, a triangular wave structure, a rectangular wave structure, a trapezoidal wave structure, or the like.

10 Claims, 10 Drawing Sheets

(52) U.S. Cl.
CPC ............ *E21B 43/08* (2013.01); *E21B 43/088* (2013.01); *B01D 2201/122* (2013.01); *B01D 2201/186* (2013.01); *B23K 2101/22* (2018.08); *B23K 2103/05* (2018.08)

(58) Field of Classification Search
CPC ....... E21B 43/088; E21B 43/08; B23K 31/02; B23K 2101/22; B23K 2103/05
See application file for complete search history.

(56) References Cited

U.S. PATENT DOCUMENTS

| | | | | |
|---|---|---|---|---|
| 4,488,966 | A | * 12/1984 | Schaeffer | B01D 29/21 210/485 |
| 4,878,930 | A | * 11/1989 | Manniso | B01D 46/0068 55/493 |
| 2002/0108359 | A1 | 8/2002 | Powell | |
| 2006/0005518 | A1 | 1/2006 | Duffy et al. | |
| 2007/0157589 | A1 | * 7/2007 | Haberkamp | B01D 46/522 55/498 |
| 2015/0014242 | A1 | * 1/2015 | Smith | B01D 29/33 210/499 |

OTHER PUBLICATIONS

International Search Report for corresponding International Application No. PCT/US2016/029566, dated Jul. 21, 2016; 2 pages.
Written Opinion of the International Searching Authority for corresponding International Application No. PCT/US2016/029566, dated Jul. 21, 2016; 5 pages.

\* cited by examiner

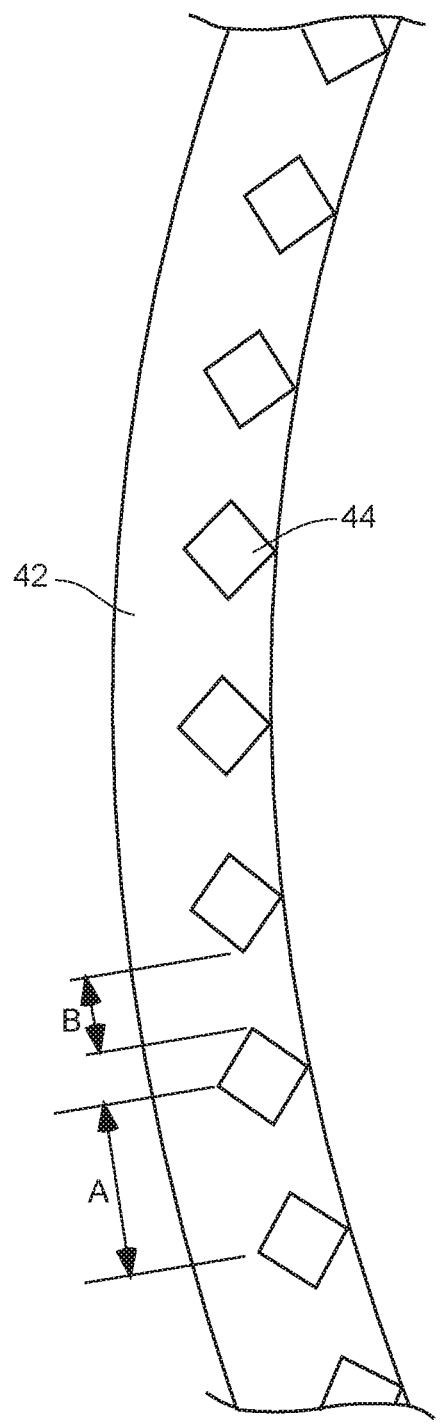

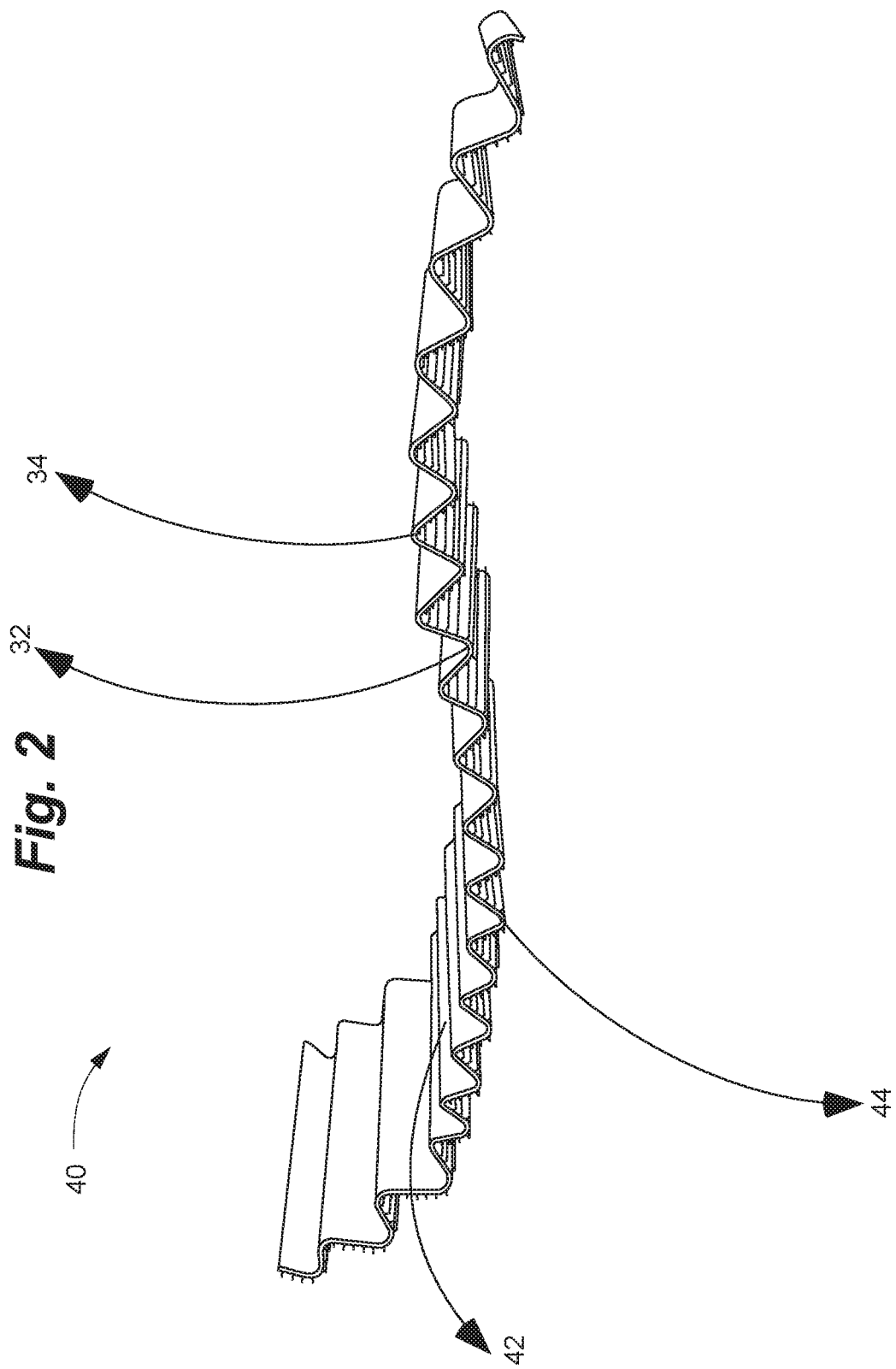

CORRUGATED FLUID INTAKE SCREEN

RELATED APPLICATIONS

The present application is a National Phase entry of PCT Application No. PCT/US2016/029566, filed on Apr. 27, 2016 and entitled "CORRUGATED FLUID INTAKE SCREEN" which claims priority to United States Provisional Application Ser. No. 62/153,304, filed Apr. 27, 2015 and entitled "CORRUGATED FLUID INTAKE SCREEN", both of which are hereby fully incorporated herein by reference.

FIELD OF THE INVENTION

The present invention is directed to screen filters. More specifically, the present invention is directed to screen filters having a corrugated filter surface so as to increase filtering capacity of the screen filter.

BACKGROUND OF THE INVENTION

Screen type filters formed of wires wrapped on support members to form filtration slots are well known in the fields of water filtration, for example, as well filters. While these filters have been successfully utilized for many years, it would be advantageous to improve upon existing designs for the purposes of increasing filtration capacity.

SUMMARY OF THE INVENTION

According to embodiments of the present invention, representative screen filters can comprise corrugated filter screens so as to increase an available filter surface and increase a flow capacity of the screen filter. A filter screen of the present invention can comprise a plurality of rods forming a series of alternate and angular ridges and grooves on a surface of the filter screen. The filter screen can be configured to have longitudinal corrugations only on an exterior surface of the filter screen or alternatively, the filter screen can be configured to have longitudinal corrugations only on an interior surface of the filter screen. In some embodiments, the alternate angular ridges and grooves can form corrugations that can be, but are not limited to, a sinusoidal wave structure, a triangular wave structure, a rectangular wave structure, a trapezoidal wave structure, or the like.

In some embodiments, a filter screen of the present invention when used in water wells to retain sand and gravel in the well hole, can be generally configured to have a substantially cylindrical contour to enable the filter screen to be attached to pipes and/or additional screens. In some such embodiments, the filter screen can include a fitting adapter configured to enable the cylindrical filter screen to be coupled with the pipes and/or additional screens. In some embodiments, the fitting adapter can include a male and female coupling configured as a threaded insert, a latched coupling, friction fit, push fit with a locking mechanism, or the like. In some embodiments, the fitting adapter can be formed integrally with the filter screen and/or the pipes. In some other embodiments, the fitting adapter can be an independent structural member, which can have one end (e.g., a first fitting end) that has the same shape as the corrugated surface of the filter screen, and as such can be welded to the filter screen, while another end (e.g., second fitting adapter end) can have a shape that is configured for operative coupling what a pipe. In some embodiments, the filter screen with longitudinal corrugations can be a flexible structure that can be attached to fluid pipes (e.g., water pipes) and/or additional screens of varying sizes. In other embodiments of the invention, the filter screen can be attached to the pipes using any type of configuration.

In another aspect, the invention can comprise methods of fabricating a corrugated filter screen. These methods can further comprise forming the corrugated filter screen so as to have a cylindrical contour, whereby a cylindrical filter screen can be used in water wells.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which:

FIG. 1B is a detail section view taken at line 3-3 of FIG. 1.

FIG. 2 is a perspective end view of a filter screen according to an embodiment of the present invention.

Figure 1A:
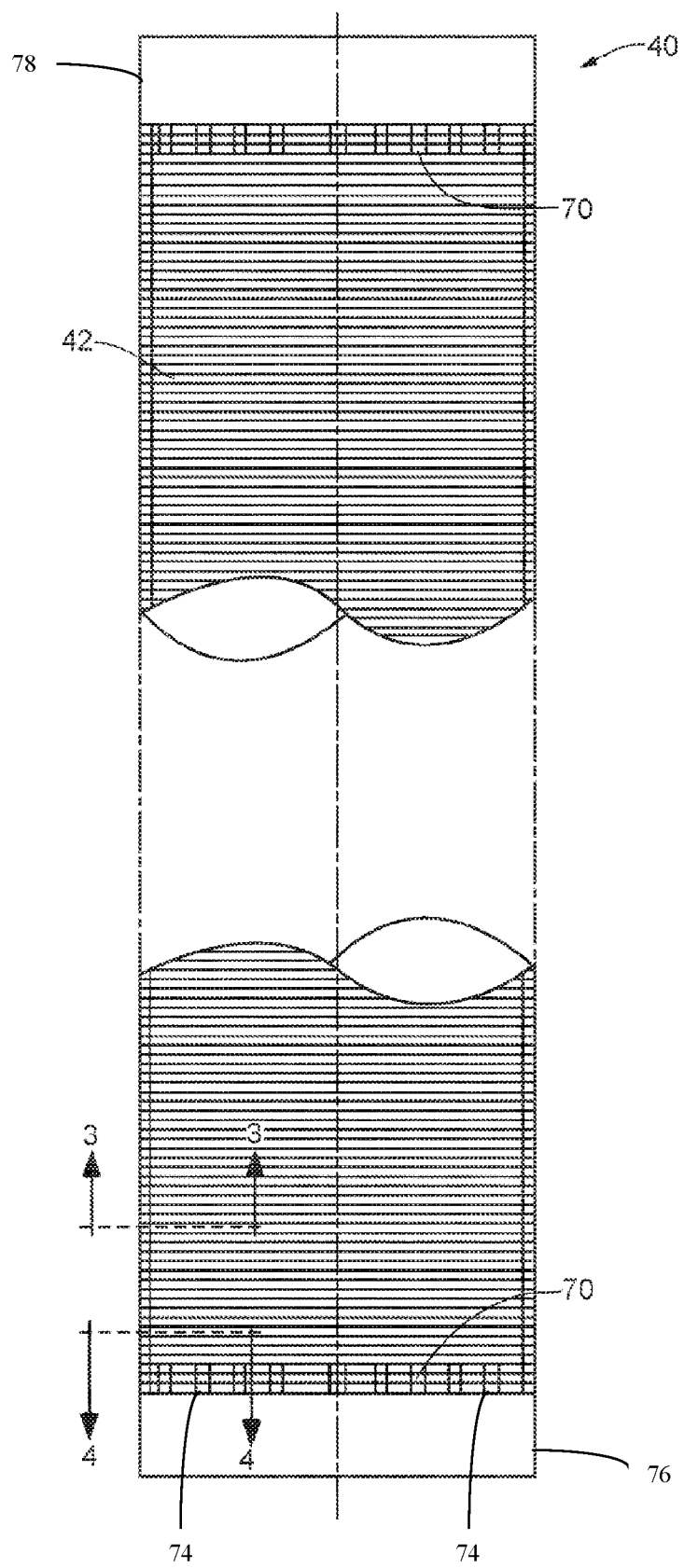
FIG. 1A is a side view of a cylindrical screen filter according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The following detailed description of embodiments refers to the accompanying drawings, which illustrate specific embodiments. Other embodiments having different structures and operation do not depart from the scope of the present disclosure.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components can be oriented in any direction and the terminology, therefore, should be understood as encompassing such variations unless specified otherwise. Throughout this disclosure, where a process or method is shown or described, the method can be performed in any order or simultaneously, unless it is clear from the context that the method depends on certain actions being performed first.

In accordance with one embodiment disclosed herein, a screen for intake of fluid is provided. The screen includes a plurality of substantially parallel, spaced rods, a filtration material, a fitting, and a plurality of structural members. The plurality of rods is distributed about a longitudinal axis, has a length, and terminates at a first end and a second end. The filtration material is disposed around a portion of the length of the plurality of rods to define an interior volume, and is configured to allow fluid to pass therethrough while preventing particulate matter greater than a predetermined size from passing therethrough. In some embodiments, the filtration material includes wire spirally wrapped around, or operatively coupled to, the plurality of rods to form slots to filter the fluid, for example, water. In some embodiments and in combination with any of the above embodiments, each end of the plurality of rods is substantially in a plane perpendicular to the longitudinal axis. The fitting is disposed at the first end of the plurality of rods and adjacent to the filtration material, and is configured to be proximate to an end of each of the rods.

Referring to the drawings, where like reference numerals refer to the same or similar parts, FIG. 1 illustrates an embodiment of the screen 40. In some embodiments and in combination with any of the above embodiments, the plurality of rods are arranged in a cylindrical configuration, the cross-section of which can include, but is not limited to a circle, an ellipse, a parabola, a hyperbola, or the like. For purposes of the present disclosure, the screen 40 has a cylindrical configuration, although its shape can be made to vary widely. In some such embodiments, the fitting is a substantially cylindrical ring. The cylindrical end fitting has a central axis and is disposed at the first end of the plurality of rods and adjacent to the wire. The central axis is aligned with the longitudinal axis of the plurality of rods.

Although the outside surface of the screen 40 appears smooth, the screen 40 is formed with openings and is shown with spirally wrapped wires 42 that form slots and serve as filtration material. In some embodiments, the screens 40 can include as filtration material, a plurality of spaced filter wires supported on support rods. In some embodiments, the screens can include "Vee-Wire" type screens. In some embodiments, the screens 40 can include as filtration material, plates (not shown) having perforations, slots, or other filter-type openings. In some embodiments, the spacing and sizes of wires 42, or other openings, vary along the lengths of the screens 40. In some embodiments, the screens 40 can include as filtration material any combination of wires 40 and plates.

The screen 40 can be fabricated based on the same principle as the embodiments disclosed in U.S. Pat. No. 6,663,774, filed on Oct. 16, 2001 and specifically with respect to the filter wires 28 and the support rods 20 described therein, and embodiments like those disclosed in U.S. Pat. No. 7,425,264, filed on Jul. 18, 2005 and specifically with respect to the wires 16 and the support rods 17 described therein, the contents of both of which patents are herein incorporated by reference in their entirety.

In the "Vee-Wire" type of screen, a filtering surface is formed by wires 42 with a V-shaped cross-section, meaning that they each have a generally triangular-shaped cross-section and which are parallel at constant intervals, the space between wires forming the slots of the screen. As shown in FIG. 1-8, these wires 42 are welded to support rods 44 oriented essentially perpendicularly with respect to the wires 42, and can be relatively thin in order to maximize the effective opening of the slots. Such a screen 40 can have the advantage of being very strong and being resistant to clogging. The screen 40 allows a liquid, for example water, to pass through it, while preventing particulate matter greater than a certain size from entering the interior of the screen 40. Each wire 42 includes a face surface and two side surfaces which converge to a point. The wires 42 are aligned, side-by-side, with their face surfaces lying in a plane, which, as will be further discussed below, creates the outer surface of the screen 40 and defines an interior volume 43.

In one method of manufacture, the screen 40 can be constructed by inserting a number of support rods 44 into a series of notches equally spaced around the circumference of a specially designed wheel (not shown). In the case of square, rectangular, or V-shaped profile rods, the notches in the wheel can be generally triangular in shape. In this way, the support rods 44 are secured around the wheel and extend substantially perpendicularly to the wheel to create a cylinder of support rods 44. The wheel, and thus the cylinder of rods 44, is then rotated and a wire 42 is continuously and spirally wrapped around the rotating cylinder of rods 44. At each point where the wire 42 intersects a rod 44, an electrical charge is conducted through the intersection and the wheel, thereby welding the wire 42 to the rod 44. The result is a screen cylinder formed with a plurality of longitudinally extending rods 44 spirally-wrapped in a wire 42. The rods 44 can be substantially parallel, spaced from each other, and distributed about a longitudinal axis, with the plurality of rods 44 having a length and terminating at a first end and a second end. Each end of the plurality of rods 44 can terminate substantially in a plane perpendicular to the longitudinal axis. The rods 44 can be arranged in, for example, a cylindrical configuration.

Figure 7:
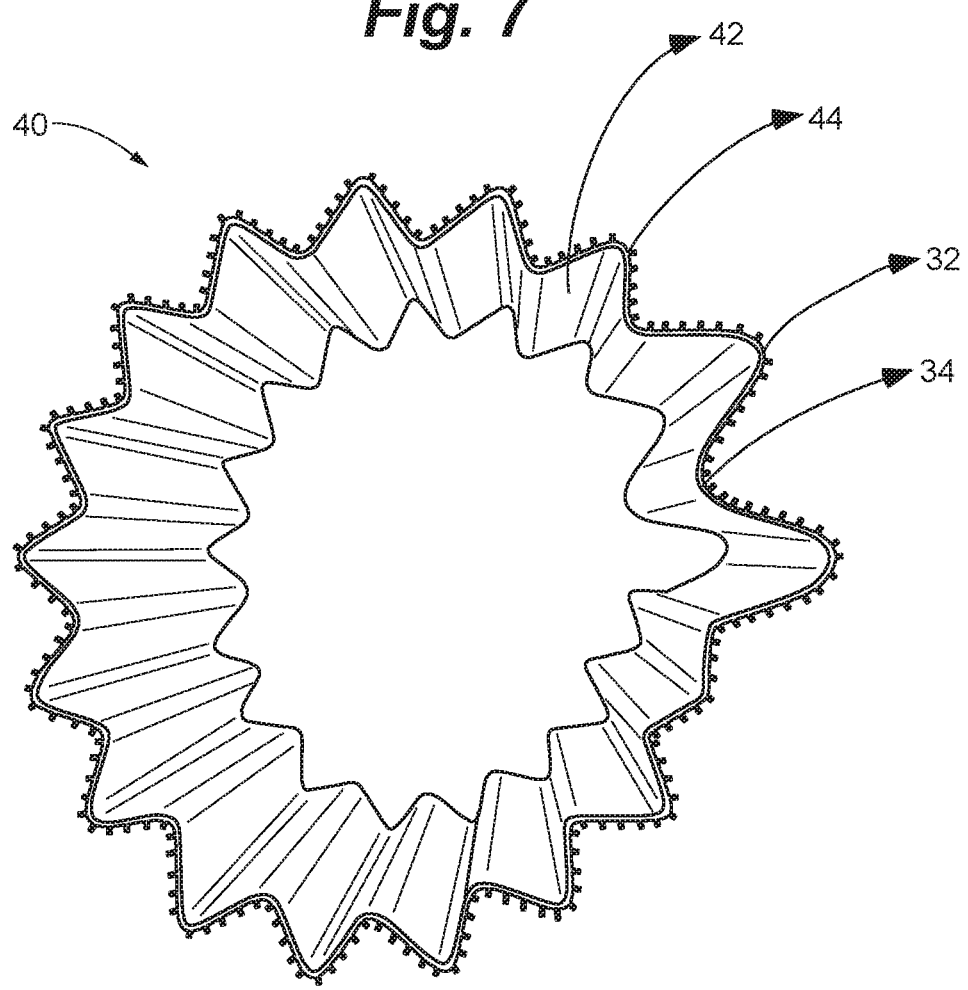
FIG. 7 is an end view of a cylindrical filter screen having a corrugated filter screen according to an embodiment of the present invention.
Figure 8:
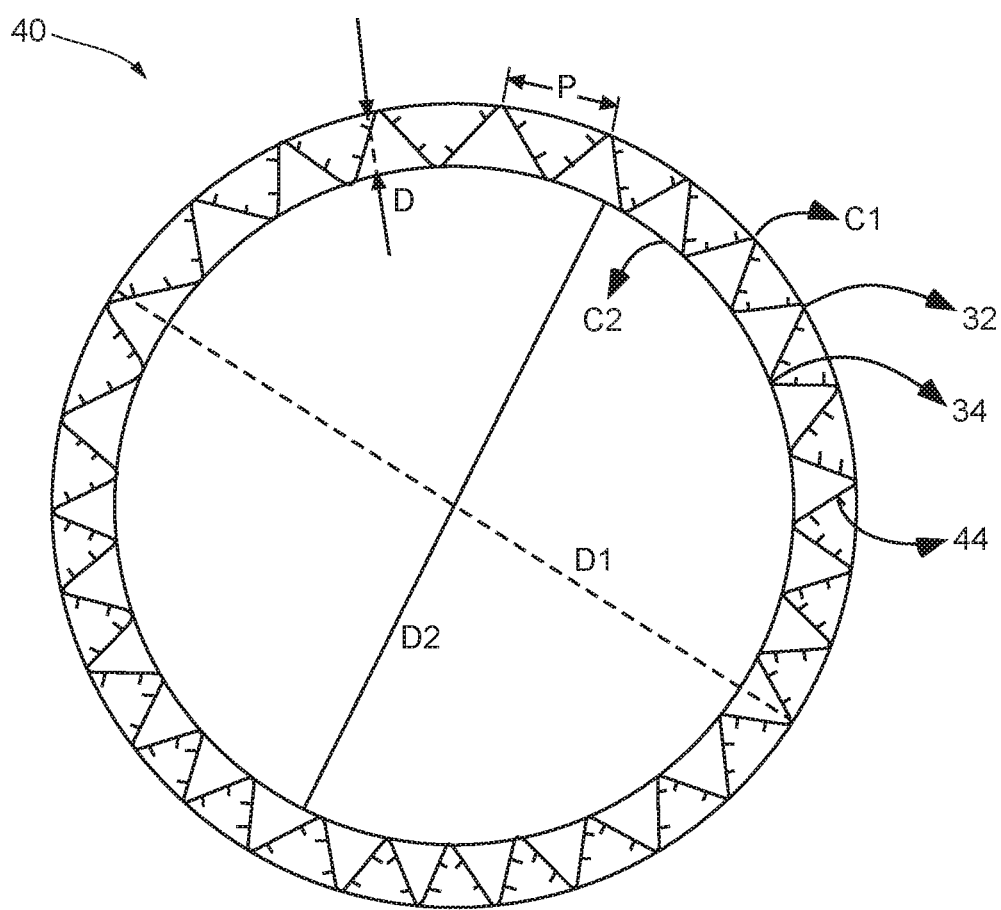
FIG. 8 is an end view of a cylindrical filter screen having a corrugated filter screen according to an embodiment of the present invention.

After cylinder screen is created it can be bent in the desired form to create a corrugated generally cylindrical screen, as illustrated by FIGS. 7 and 8. In some embodiments of the invention the screen can be created along a flat surface or other shaped surface, bent into the desired corrugated shape, and then formed into a generally cylindrical shape with a corrugated surface. In still other embodiments, the rods and wires can be assembled in the corrugated configuration in any desired shape.

When using wires of V-shaped cross-section, a channel is created between opposing side surfaces of consecutive wires. Because of the triangular shaped cross-section of the wires in one embodiment, the channels between consecutive wires open away from the plane defined by the face surfaces of the filter wires. Put another way, the filter channels do not have parallel walls, but instead flare from the face surfaces to the points of the wires.

Figure 1C:
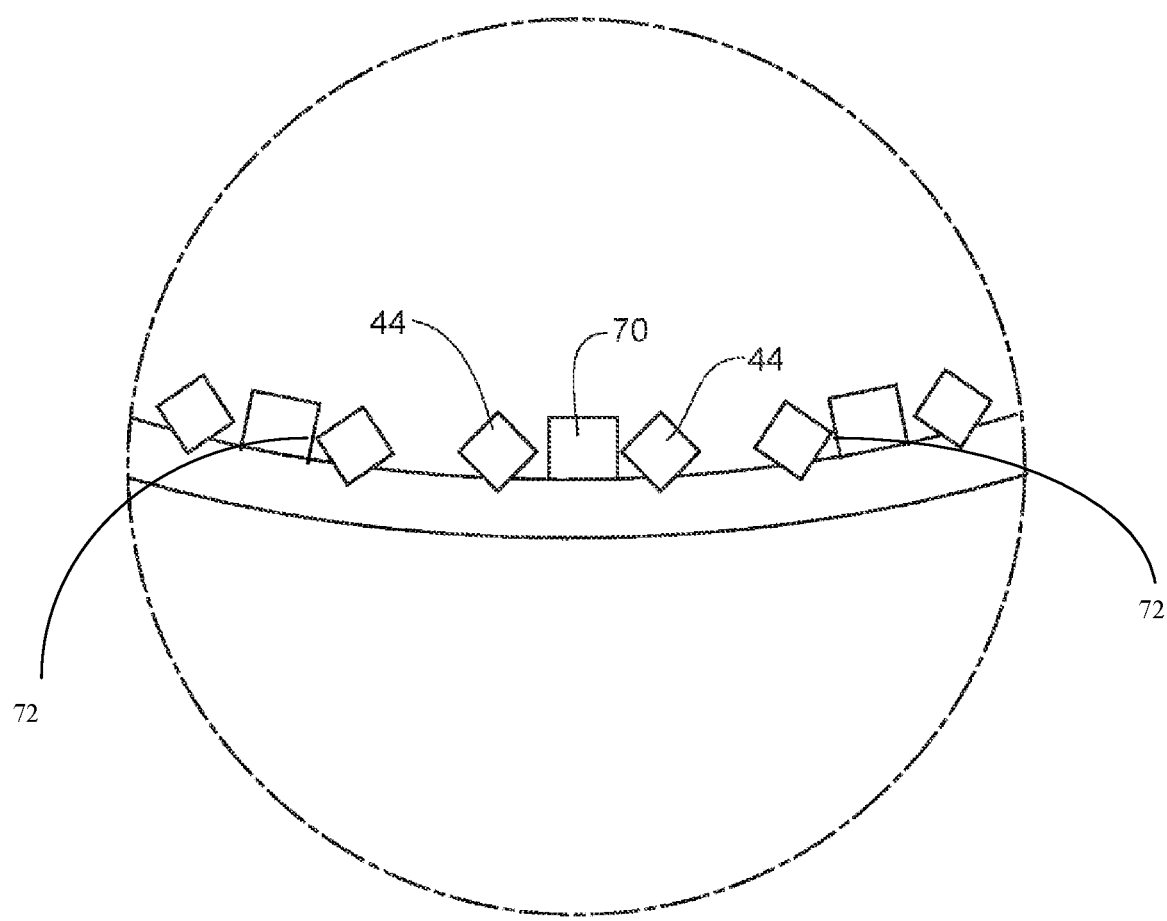
FIG. 1C is a detail section view taken at line 4-4 of FIG. 1.
Figure 3:
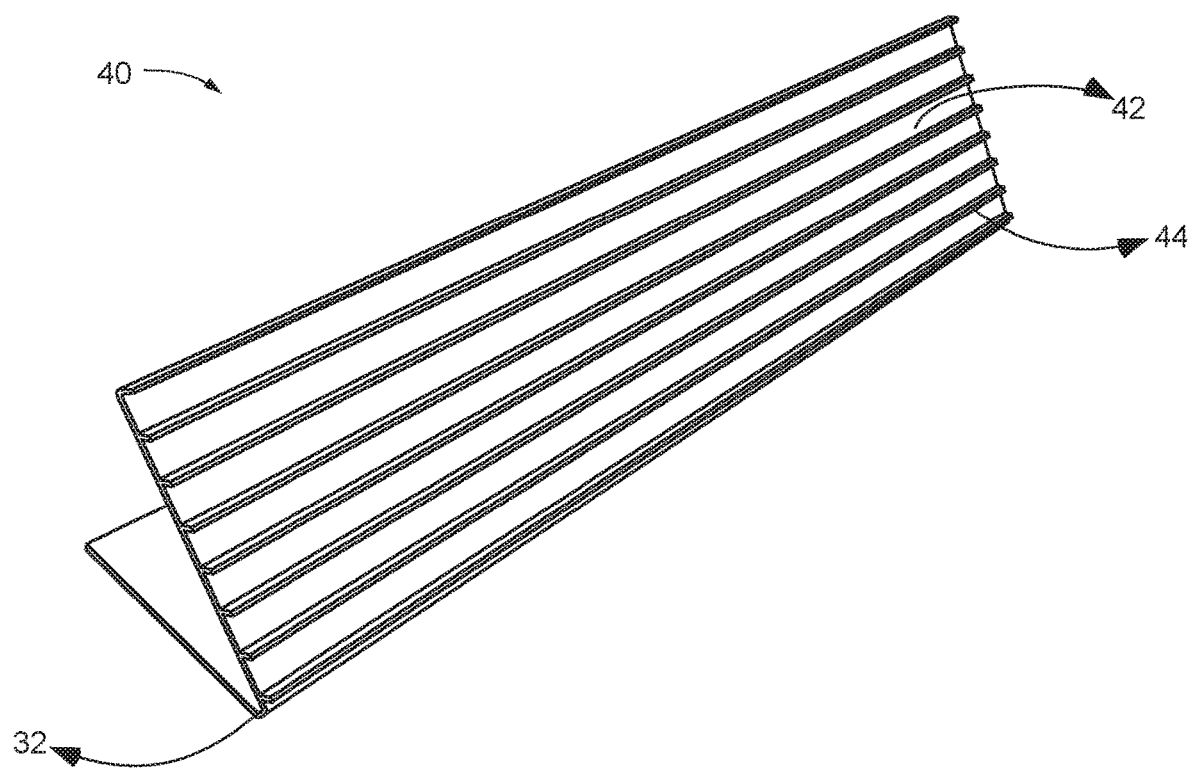
FIG. 3 is a perspective view of a filter screen according to an embodiment of the present invention.
Figure 4:
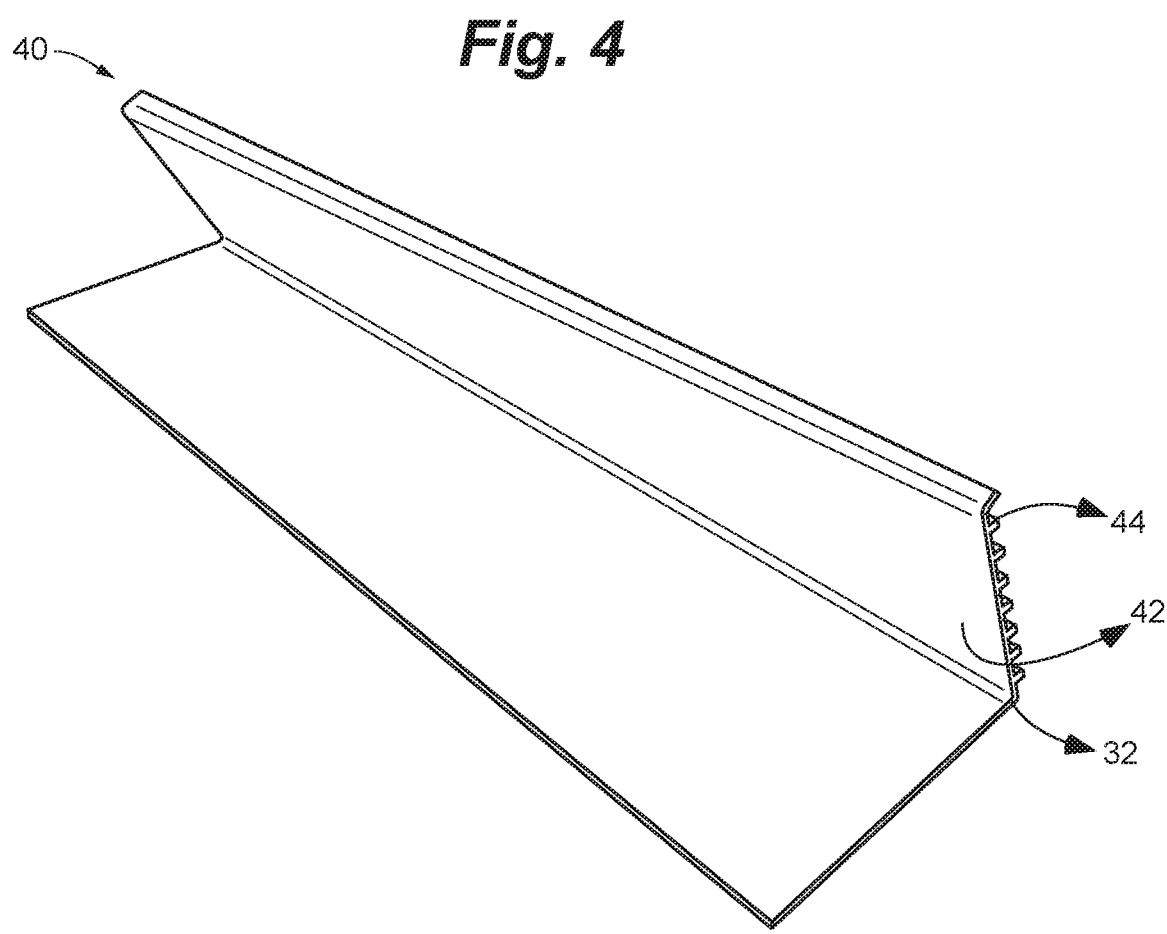
FIG. 4 is a perspective view of a corrugated filter screen according to an embodiment of the present invention.
Figure 5:
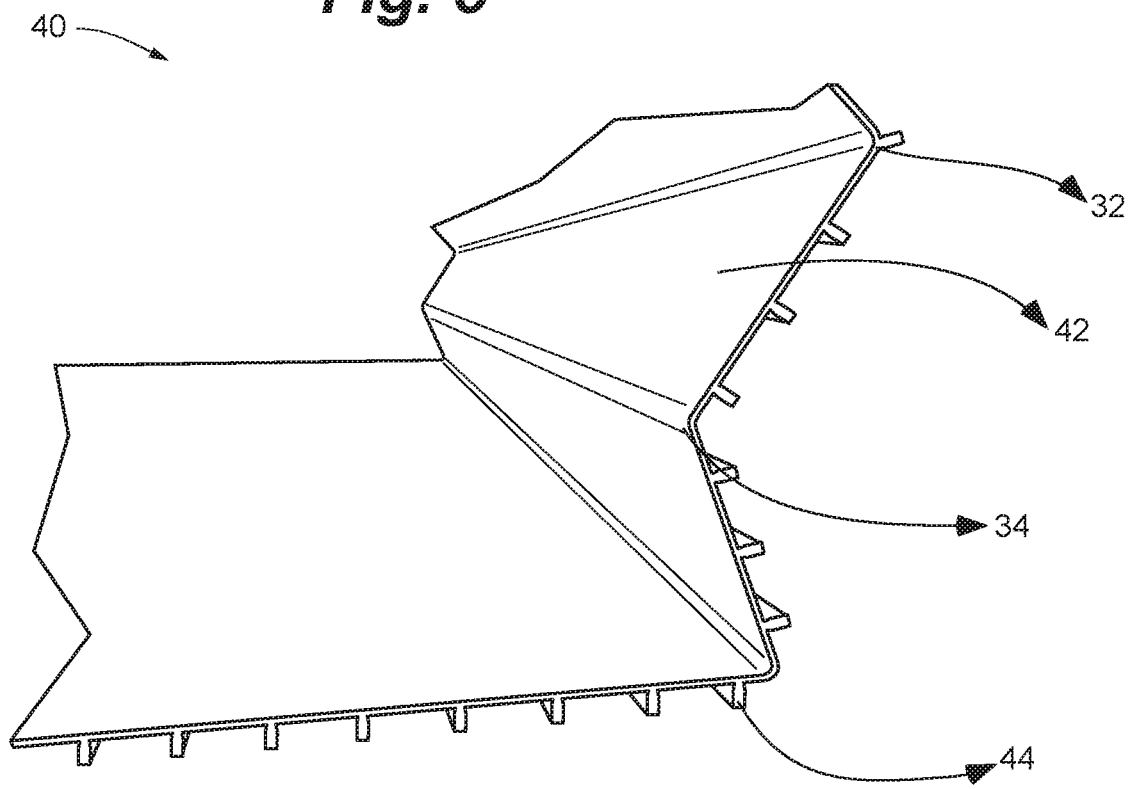
FIG. 5 is a perspective end view of a corrugated filter screen according to an embodiment of the present invention.
Figure 6:
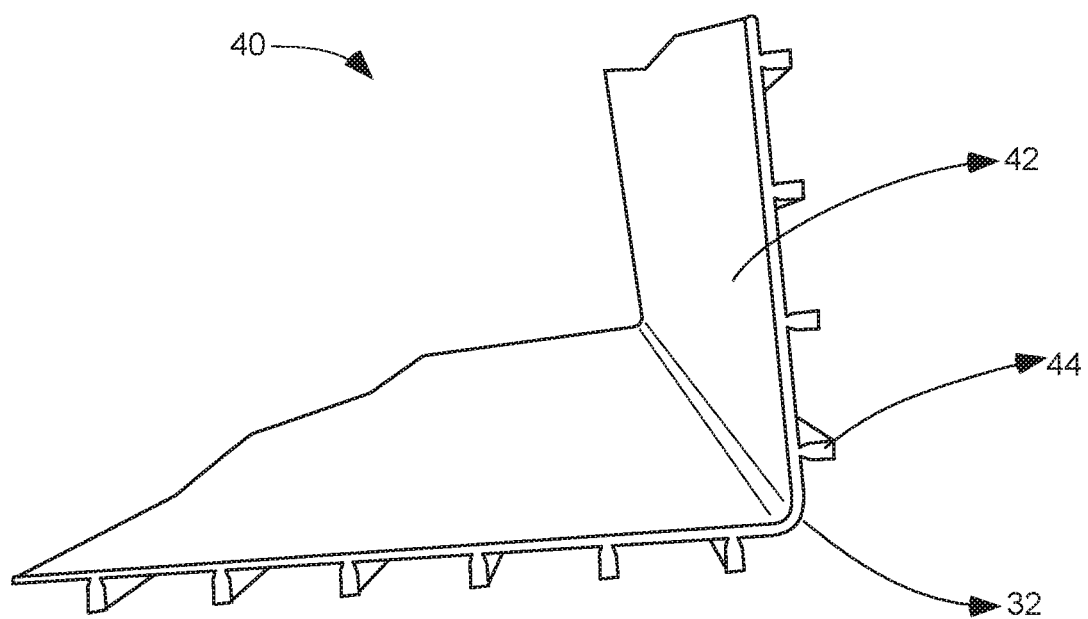
FIG. 6 is a perspective end view of a corrugated filter screen according to an embodiment of the present invention.

As shown in FIG. 1C, in one embodiment of a screen 40, in between the rods 44 at the ends of the screen 40 are supplemental bars 70, which can also be referred to as structural members, tabs, or spacers. The bars 70 can be elongated and substantially span the distance between pairs of adjacent rods 44 and be substantially parallel to the rods 44. In the embodiment shown the bars 70 are located between every other pair of rods 44. Alternatively, the bars 70 could be in the spaces between all adjacent rods 44, or could be at less frequent intervals with the necessary spacing dependent on the application. The number of rods 44 and their spacing can also be varied. In this embodiment the bars 70 are rectangular and are welded to the rods 44 at a first weld area 72, but other shapes are feasible and can be desirable depending on the application. In some such embodiments, at least the first end of each bar is welded at a second weld area 74 to the fitting. The bars 70 are preferably flush with the ends of the rods 44, and can be relatively short, not as long as the rods 44 and not extending the entire length of the screen 40. In the embodiments shown herein, the bars 70 are very short relative to the rods 44. The bars 70 can each have a first end proximate to the first end of the plurality of rods and a second end spaced from the second end of the plurality of rods. In addition, it can be considered that the bars 70 disclosed herein, as structural members, can be provided in more than one piece. For example, each structural member can be provided as two or more elongated bars, and as such, more than one bar can be inserted between adjacent rods 44 to make up a structural member.

The invention is not limited to any particular shape for the screen 40. In some embodiments, the screen 40 can be substantially similar or different from the shape of the body presented in FIGS. 1 and 7-8. For example, the screen 40 can be a substantially planar shape on a two-dimensional plane such as a rectangle, triangle a circle, a polygon, or the like, or an object on a three-dimensional plane such as a cylinder, a cube, a sphere, or the like. In one embodiment, the actual shape of the screen 40 can be exactly conform or even approximate any of the above mentioned shapes.

FIGS. 2-6 illustrate other embodiments of the screen. The screen 40 is configured to have longitudinal corrugations on the surface of the screen 40. For purposes of the invention, the screen 40 has a cylindrical configuration, although its shape can be made to vary widely. As shown in FIGS. 2-6, the screen 40 comprises a plurality of rods forming a series of alternate and angular ridges 32 and grooves 34 on the surface of the screen 40 (e.g., otherwise described as peaks and troughs, or the like). In one aspect, the screen 40 can be configured to have longitudinal corrugations only on the exterior surface of the screen 40. In another aspect, the screen 40 can be configured to have longitudinal corrugations only on the interior surface of the screen 40. The alternate angular ridges 32 and grooves 34 can form corrugations that can be, but are not limited to, a sinusoidal wave structure, a triangular wave structure, a rectangular wave structure, trapezoidal wave structure, or the like.

The screen 40 shown in FIGS. 1A-8, when used in water wells to retain sand and gravel in the well hole, is generally configured to have a substantially cylindrical contour to enable the screen 40 to be attached to the pipes and/or additional screens. In some such embodiments, a fitting 76 can be an adapter configured to enable the screen 40 to be coupled with the pipes and/or additional screens. In some embodiments, the attachment can include a male and female coupling configured as a threaded insert, a latched coupling, friction fit, push fit with a locking mechanism, or the like. In some embodiments, the fitting 76 can be formed integrally with the screen 40 and/or the pipes. In some other embodiments, the fitting 76 can be an independent structural member, which can have one end (e.g., a first fitting end) that has the same shape as the corrugated surface of the screen 40, and as such can be welded to the screen 40, which a second fitting 78 (e.g., second fitting end) can have a shaped that is configured for operative coupling what a pipe. In some embodiments, the screen 40 with longitudinal corrugations can be a flexible structure that can be attached to fluid pipes (e.g., water pipes) and/or additional screens of varying sizes. In other embodiments of the invention the screen can be attached to the pipes using any type of configuration.

FIGS. 7-8 show a cross section of the screen 40 in a cylindrical configuration comprising longitudinal corrugations, in accordance with an embodiment of the invention. In one embodiment, the cylindrical screen 40 comprises an outer diameter D1, an inner diameter D2, an outer circumference C1 an inner circumference C2, a pitch P defined as the distance between two ridges, and a depth D defined as the absolute distance between the top of a ridge and the bottom of a corresponding groove, (e.g., the effective height of a ridge with respect to the adjacent groove, or vice versa). The outer diameter D1 can be approximated by defining an outer circumference C1 of the cylindrical screen 40 as the aggregated distance between each ridge with its adjacent ridges, as shown in FIG. 8. The outer diameter D1 can then be approximated accordingly. Similarly, the inner diameter D2 can be approximated by defining an inner circumference C2 of the cylindrical screen 40 as the aggregated distance between each groove with its adjacent grooves, as shown in FIG. 8. The inner diameter D2 can then be approximated accordingly. In this way, the depth D can be defined as the difference between the outer diameter D1 and the inner diameter D2 as shown in FIG. 8. Typically, the pitch P and depth D of the corrugations on the cylindrical screen 40 are uniform throughout the surface of the cylindrical screen 40. The greater the pitch P, the more oblique the angle the corrugations make relative to the alternating ridges 32 and grooves 34. However, in some embodiments, the pitch P and depth D of the corrugations can vary along the surface of the cylindrical screen B. These dimensions can be varied to suit a particular need. For example, the greater the P angle of the corrugations the more surface area can be created around the surface of the screen; however, this can also cause more dirt, sand, or other like sediment to build up between the corrugations (e.g., tighter area can allow for build-up of sediment).

Traditional cylindrical screens, as shown in FIG. 1A-1C, used in water wells comprise a substantially smooth and curved outer surface with a predefined surface area S' and a corresponding outer circumference C'. The corrugated configuration of the cylindrical screen 40, as shown in FIGS. 2-8, with substantially similar dimensions as that of the traditional cylindrical screen provides the functional benefit of defining an outer surface with an increased surface area S while retaining the outer circumference C1 of the corrugated configuration to remain substantially equal to the circumference C' of the traditional cylindrical screen. In doing so, the volume of fluid, for example water, passing through the surface of the cylindrical screen with a corrugated configuration is greater than the volume of liquid passing through the surface of the traditional cylindrical screen. In addition, the overall tensile strength of the screen 40 with longitudinal corrugations is greater than the tensile strength of traditional cylindrical screens as the tensile strength of the screen 40 with longitudinal corrugations depend on both the strength of the longitudinal rods and the corrugations, more specifically, the angle the corrugations make relative to the alternating ridges 32 and grooves 34. Also, the flexible structure of the screen 40 because of the longitudinal corrugations enables an adjustable connection between the screen and the fittings, pipes, surrounding area, and/or additional screens of varying dimensions.

Materials for the screens can be selected by one of ordinary skill in the art as appropriate for the particular application, but one material that can be used is AISI 316 stainless steel. For 316 Stainless Steel, design features, characteristics, and strengths in one embodiment of screens in accordance with the previously described embodiments for a well are as follows:

| Feature | English Units | Metric Units |
| --- | --- | --- |
| Nominal Size | 24 in | 610 mm |
| Estimated Total Well Depth | 1,500 ft | 457 meters |
| Estimated Feet of Screen | 850 ft | 259 meters |
| Design Slot Size | 0.070 in | 1.8 mm |
| Approx. O.D. | 23.94 in | 608 mm |
| Screen Barrel I.D. | 22.19 in | 564 mm |
| Approx. Clear I.D. at Fittings | 21.69 in | 551 mm |
| Approx. Weight Per Foot | 100 lbs | 46 kg |
| Wire Width | 0.248 in | 6.3 mm |
| Wire Height | 0.488 in | 12.4 mm |
| Calculated Collapse Strength | 2323 PSI | 16 kg/sq. cm |
| Open Area | 22.0% | 22.0% |
| Intake Area | 199 sq. in/ft | 4,206 sq. cm/meter |
| Transmitting Capacity-at 0.1 feet/second | 62 gpm/ft | 13.5 lps/meter |
| Support Rod Diameter (circle through all corners of rod) | 0.530 in | 13.5 mm |
| Number of Rods | 70 | 70 |
| Cross-Sectional Rod Area (total) | 9.84 in | 63.51 sq. cm |
| Design Yield Strength | 30,000 PSI | 2,109 kg/sq. cm |
| Calculated Tensile Strength | 206,700 lbs | 93,800 kg |
| Maximum Recommended Hang Weight | 103,400 lbs | 46,900 kg |
| Column Load | 265,000 lbs | 120,500 kg |

It should be understood that the values listed in Table 1 are for one particular application. It should be understood that the values in Table 1 for the particular application, or for any other size or type of corrugated screen can be higher, lower, or be in ranges that can or can not include the illustrated values.

Embodiments disclosed herein can provide relatively more open area for intake of fluid than conventional screens, with added overall strength for applications in dewatering and water supply, or other applications, and can be of particular benefit for water wells in the mining industry.

Although specific embodiments have been illustrated and described herein, those of ordinary skill in the art appreciate that any arrangement which is calculated to achieve the same purpose can be substituted for the specific embodiments shown and that the embodiments herein have other applications in other environments. This application is intended to cover any adaptations or variations of the present disclosure. The following claims are in no way intended to limit the scope of the disclosure to the specific embodiments described herein. While the foregoing is directed to embodiments of a screen and components used in water wells, other and further embodiments (e.g., other fluid applications) can be devised without departing from the basic scope thereof, and the scope thereof is determined by the claims that follow.

The invention claimed is:

1. A screen for intake of fluid, comprising:
   a plurality of substantially parallel, spaced rods distributed about a longitudinal axis, the plurality of rods having a length and terminating at a first end and a second end;
   filtration material disposed around a portion of the length of the plurality of rods to define an interior volume and exterior surface such that the plurality of rods are at least partially exposed on the exterior surface, the filtration material including a plurality of slots defined by welding parallel wires to the plurality of rods, wherein the parallel wires and the plurality of rods are oriented in perpendicular relation to each other, wherein the plurality of rods and the filtration material are arranged to form a series of alternate ridges and grooves on the exterior surface, the filtration material configured to allow fluid to pass therethrough while preventing particulate matter greater than a predetermined size from passing therethrough; and
   a fitting at the first end of the plurality of rods and adjacent to the filtration material, the fitting configured to be proximate to an end of each of the rods.

2. The screen of claim 1, wherein the ridges and grooves are substantially angular and comprises a pitch and a depth, wherein the pitch is defined as a distance between two adjacent ridges, wherein the depth is defined as a distance between a top of a ridge and a bottom of an adjacent groove.

3. The screen of claim 2, wherein the pitch and the depth are variable.

4. The screen of claim 1, further comprising:
   a plurality of structural members, each structural member interposed between adjacent rods and having a first end proximate to the first end of the plurality of rods and a second end spaced from the second end of the plurality of rods, wherein the structural members are welded to the adjacent rods forming a plurality of first welded areas, and the adjacent rods and the structural members are welded to the fitting forming a plurality of second welded areas.

5. The screen of claim 4, wherein the welding of the structural members to the adjacent rods and the fitting increases the size of the plurality of second welded areas, wherein the increased size of the plurality of second welded areas increases a tensile strength of the plurality of second welded areas.

6. The screen of claim 1, wherein each of the plurality of rods is substantially in a plane perpendicular to the longitudinal axis.

7. The screen of claim 1, wherein the plurality of rods is arranged in a generally cylindrical configuration.

8. The screen of claim 7, wherein the fitting is arranged in a generally-cylindrical shape.

9. The screen of claim 1, wherein the screen comprises a flexible structure capable of being adjustably coupled to a pipe and/or another screen of varying sizes.

10. The screen of claim 1, wherein the parallel wire has a V-shaped cross-section.

* * * * *